US010405212B2

(12) United States Patent
Xie

(10) Patent No.: US 10,405,212 B2
(45) Date of Patent: Sep. 3, 2019

(54) METHOD AND APPARATUS FOR IMPLEMENTING SELF RECOVERY OF BASE STATION DEVICE

(71) Applicant: ZTE Corporation, Shenzhen (CN)

(72) Inventor: Min Xie, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 241 days.

(21) Appl. No.: 15/109,159

(22) PCT Filed: Jun. 18, 2014

(86) PCT No.: PCT/CN2014/080252

§ 371 (c)(1),
(2) Date: Jun. 30, 2016

(87) PCT Pub. No.: WO2015/100962

PCT Pub. Date: Jul. 9, 2015

(65) Prior Publication Data

US 2016/0330636 A1 Nov. 10, 2016

(30) Foreign Application Priority Data

Dec. 31, 2013 (CN) .......................... 2013 1 0751094

(51) Int. Cl.
*H04J 3/14* (2006.01)
*H04W 24/04* (2009.01)
*H04W 88/08* (2009.01)

(52) U.S. Cl.
CPC ............ *H04W 24/04* (2013.01); *H04W 88/08* (2013.01)

(58) Field of Classification Search
None
See application file for complete search history.

(56) References Cited

U.S. PATENT DOCUMENTS 6,122,759 A * 9/2000 Ayanoglu .............. H04L 1/1678 714/4.2
9,204,315 B2 * 12/2015 Sridhar ................. H04W 24/02
(Continued)

FOREIGN PATENT DOCUMENTS

CN 101600216 A 12/2009
CN 102300207 A 12/2011
(Continued)

OTHER PUBLICATIONS

International Search Report for corresponding application PCT/CN2014/080252 filed on Jun. 18, 2014; dated Oct. 10, 2014.
(Continued)

*Primary Examiner* — Kwang B Yao
*Assistant Examiner* — Juvena W Loo
(74) *Attorney, Agent, or Firm* — Cantor Colburn LLP

(57) ABSTRACT

Provided are a method and apparatus for implementing self recovery of a base station device, which relate to the technical field of communications. The method includes that: it is monitored, in real time, whether a base station device generates a fault or performance index event; when it is monitored that the base station device generates the fault or performance index event, a self-recovery alarm configuration file is searched according to the monitored fault or performance index event; corresponding self-recovery execution information is acquired according to the found self-recovery alarm configuration file; and self-recovery is implemented according to the self-recovery execution information. By means of automatic self-recovery on an alarm based on a found pre-provided self-recovery rule, the technical solution can reduce the complexity of manually handling a fault, and reduces the dependence of fault handling on a professional engineer.

9 Claims, 3 Drawing Sheets

(56) References Cited

U.S. PATENT DOCUMENTS

| | | | | |
|---|---|---|---|---|
| 9,967,757 | B2 * | 5/2018 | Tehrani | H04W 72/0426 |
| 2003/0021251 | A1 | 1/2003 | Moshiri-Tafreshi | |
| 2005/0070322 | A1 * | 3/2005 | Tayloe | H04W 36/18 455/522 |
| 2007/0190996 | A1 * | 8/2007 | Asthana | H04M 3/12 455/420 |
| 2012/0059899 | A1 * | 3/2012 | Kashi | H04L 63/105 709/212 |
| 2012/0182909 | A1 * | 7/2012 | Yamamoto | H04W 56/002 370/281 |
| 2015/0065122 | A1 * | 3/2015 | Futaki | H04W 24/04 455/424 |

FOREIGN PATENT DOCUMENTS

| | | | | |
|---|---|---|---|---|
| CN | 103118359 | A | 5/2013 | |
| JP | 2012512578 | A | 5/2012 | |
| WO | WO-2009106138 | A1 * | 9/2009 | H04W 24/04 |
| WO | 2013136813 | A1 | 9/2013 | |

OTHER PUBLICATIONS

"3rd Generation Partnership Project; Technical Specification Group Services and Systems Aspects; Telecommunication management; Self-Organizing Networks (SON); Self-healing concepts and requirements (Release 11)", 3rd Generation Partnership Project (3GPP), Sep. 25, 2012, vol. 11.0.0 XP050915948, pp. 7-8.

Supplementary European Search Report dated Nov. 2016 re: Application No. EP 14 87 6971, pp. 1-9, citing: WO 2013/136813 A1, CN 103 118 359 A and "3rd Generation Partnership . . . ".

* cited by examiner

METHOD AND APPARATUS FOR IMPLEMENTING SELF RECOVERY OF BASE STATION DEVICE

TECHNICAL FIELD

The present disclosure relates to the technical field of communications, and in particular to a method and apparatus for implementing self recovery of a base station device.

BACKGROUND

A Self-Organizing Network (SON) is a concept proposed by mobile operators in a standardizing stage of a Long Term Evolution (LTE) network. A main purpose of introducing the SON is to implement some autonomous functions of a wireless network, reduce manual intervention and reduce the operation cost. Self-recovery is an important function of the SON, and is intended to solve or reduce faults of a base station device by automatically triggering fault or performance recovery actions.

In a mobile communication system, a network layer is commonly divided into a Network Management System (NMS), an Element Management System (EMS) and a Network Equipment (NE). When the NE has a fault or undergoes performance deterioration, events such as a fault or performance index event are reported to the EMS via a southbound interface. A user has to pay attention to these events at any time and respond correspondingly and correctly to remove the fault or optimize the performance. In order to handle these fault and performance events, the user needs to have some basic professional skills and is required to have knowledge of the system to a certain extent, or even needs to turn to a professional engineer. The system cannot automatically implement self-recovery or performance recovery.

SUMMARY

The embodiments of the present disclosure provide a method and apparatus for implementing self recovery of a base station device, which are intended to at least solve the problem in the relevant art that a system cannot automatically implement self-recovery or performance recovery.

According to one aspect of the embodiments of the present disclosure, a method for implementing self recovery of a base station device is provided, which may include that:

it is monitored, in real time, whether a base station device generates a fault or performance index event;

when it is monitored that the base station device generates the fault or performance index event, a self-recovery alarm configuration file is searched according to the monitored fault or performance index event;

corresponding self-recovery execution information is acquired according to the found self-recovery alarm configuration file; and self-recovery is implemented according to the self-recovery execution information.

Optionally, the self-recovery alarm configuration file may include a single NE self-recovery alarm configuration file and an associated NE self-recovery alarm configuration file.

Optionally, the single NE self-recovery alarm configuration file may be saved in an NE, and the associated NE self-recovery alarm configuration file may be saved in a network manager.

Optionally, the step that when it is monitored that the base station device generates the fault or performance index event, the self-recovery alarm configuration file is searched according to the monitored fault or performance index event may include that:

when it is monitored that the base station device generates a fault or performance index event of a single NE, the self-recovery alarm configuration file is searched in the NE according to the monitored fault or performance index event of the single NE; and when it is monitored that the base station device generates a fault or performance index event of an associated NE, the self-recovery alarm configuration file is searched in a network manager according to the monitored fault or performance index event of the associated NE.

Optionally, the self-recovery execution information may include a self-recovery action, a self-recovery execution mode and a self-recovery execution device for executing the self-recovery action.

Optionally, the self-recovery action may include a recovery action, a compensation action and an ending action.

Optionally, when the single NE or associated NE is not able to recover an alarm about the fault or performance index event by using the recovery action, the compensation action may be executed, wherein the compensation action may refer to that an NE having no alarm is not allowed to be switched to a fault cell of an NE having the alarm by modifying a parameter of the NE having no alarm.

According to another aspect of the embodiments of the present disclosure, an apparatus for implementing self recovery of a base station device is provided, which may include:

a monitoring component, configured to monitor, in real time, whether a base station device generates a fault or performance index event;

a searching component, configured to search, when it is monitored that the base station device generates the fault or performance index event, for a self-recovery alarm configuration file according to the monitored fault or performance index event;

an acquisition component, configured to acquire corresponding self-recovery execution information according to the found self-recovery alarm configuration file; and a self-recovery component, configured to implement self-recovery according to the self-recovery execution information.

Optionally, the self-recovery alarm configuration file may include a single NE self-recovery alarm configuration file and an associated NE self-recovery alarm configuration file, wherein the single NE self-recovery alarm configuration file may be saved in an NE, and the associated NE self-recovery alarm configuration file may be saved in a network manager.

Optionally, the searching component may include:

an NE searching element, configured to search, when it is monitored that the base station device generates a fault or performance index event of a single NE, the NE for the self-recovery alarm configuration file according to the monitored fault or performance index event of the single NE; and a network manager searching element, configured to search, when it is monitored that the base station device generates a fault or performance index event of an associated NE, a network manager for the self-recovery alarm configuration file according to the monitored fault or performance index event of the associated NE.

Compared with the relevant art, the embodiments of the present disclosure have the beneficial effects as follows.

The embodiments of the present disclosure pre-set a fault self-recovery rule, and under the condition that a base station has a fault or undergoes performance deterioration, a system automatically handles a fault according to the self-recovery rule, thereby reducing the complexity of manually handling a fault, reducing the dependence of fault handling on a professional engineer, and maintaining a base station device more safely and effectively.

DETAILED DESCRIPTION OF THE EMBODIMENTS

The example embodiments of the present disclosure are described below with reference to the drawings in detail. It should be understood that the example embodiments described below are only intended to describe and explain the embodiments of the present disclosure, and do not limit the embodiments of the present disclosure.

In the embodiments of the present disclosure, a corresponding self-recovery rule is searched according to an alarm type, an executable self-recovery action, a self-recovery execution mode and a self-recovery execution device (NE or network manager) for the alarm are given in the self-recovery rule, and a system executes a self-recovery flow according to the self-recovery rule and automatically recovers a fault. The solution can be applied to two kinds of scenarios, i.e., an intra-NE scenario and an inter-NE scenario. An NE performs fault recovery according to the self-recovery rule for an alarm which can be handled by this NE, and a network manager and the NE cooperatively implement fault recovery according to the self-recovery rule for an alarm which cannot be handled by this NE or an inter-NE alarm.

Figure 1:
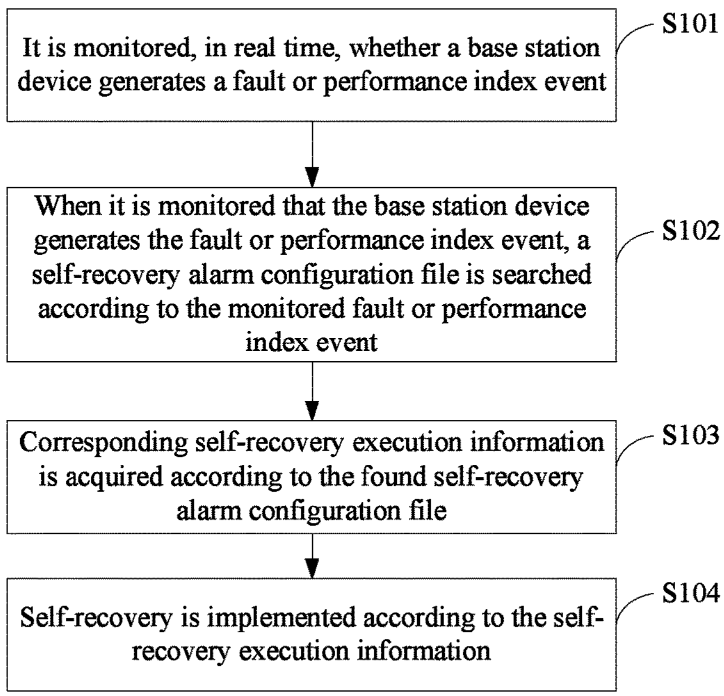
FIG. 1 is a flowchart of a method for implementing self recovery of a base station device according to an embodiment of the present disclosure.

FIG. 1 shows a flowchart of a method for implementing self recovery of a base station device according to an embodiment of the present disclosure. As shown in FIG. 1, the method includes the steps (Step S101 to Step S104) as follows.

Step S101: It is monitored, in real time, whether a base station device generates a fault or performance index event.

Step S102: When it is monitored that the base station device generates the fault or performance index event, a self-recovery alarm configuration file is searched according to the monitored fault or performance index event.

Step S103: Corresponding self-recovery execution information is acquired according to the found self-recovery alarm configuration file.

Step S104: Self-recovery is implemented according to the self-recovery execution information.

In the embodiment of the present disclosure, the self-recovery alarm configuration file may include a single NE self-recovery alarm configuration file and an associated NE self-recovery alarm configuration file, wherein the single NE self-recovery alarm configuration file may be saved in an NE, and the associated NE self-recovery alarm configuration file may be saved in a network manager.

In an implementation mode of the embodiment of the present disclosure, the step that when it is monitored that the base station device generates the fault or performance index event, the self-recovery alarm configuration file is searched according to the monitored fault or performance index event may include that: when it is monitored that the base station device generates a fault or performance index event of a single NE, the self-recovery alarm configuration file is searched in the NE according to the monitored fault or performance index event of the single NE; and when it is monitored that the base station device generates a fault or performance index event of an associated NE, the self-recovery alarm configuration file is searched in the network manager according to the monitored fault or performance index event of the associated NE.

In the embodiment of the present disclosure, the self-recovery execution information may include a self-recovery action, a self-recovery execution mode and a self-recovery execution device for executing the self-recovery action, wherein the self-recovery action may include a recovery action, a compensation action and an ending action.

When the single NE or associated NE is not able to recover an alarm about the fault or performance index event by using the recovery action, the compensation action is executed, wherein the compensation action refers to that an NE having no alarm is not allowed to be switched to a fault cell of an NE having the alarm by modifying a parameter of the NE having no alarm.

Figure 2:
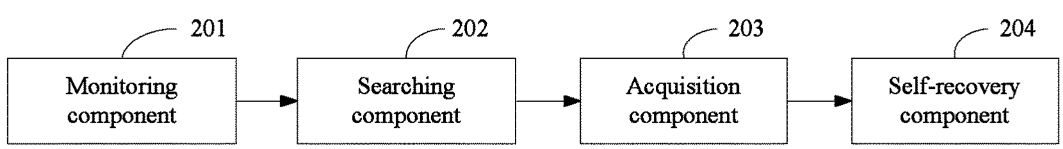
FIG. 2 is a flowchart of an apparatus for implementing self recovery of a base station device according to an embodiment of the present disclosure.

FIG. 2 shows a flowchart of an apparatus for implementing self recovery of a base station device according to an embodiment of the present disclosure. As shown in FIG. 2, the apparatus includes: a monitoring component 201, configured to monitor, in real time, whether a base station device generates a fault or performance index event; a searching component 202, configured to search, when it is monitored that the base station device generates the fault or performance index event, for a self-recovery alarm configuration file according to the monitored fault or performance index event; an acquisition component 203, configured to acquire corresponding self-recovery execution information according to the found self-recovery alarm configuration file; and a self-recovery component 204, configured to implement self-recovery according to the self-recovery execution information.

In the embodiment of the present disclosure, the self-recovery alarm configuration file may include a single NE self-recovery alarm configuration file and an associated NE self-recovery alarm configuration file, wherein the single NE self-recovery alarm configuration file may be saved in an NE, and the associated NE self-recovery alarm configuration file may be saved in a network manager.

In an implementation mode of the embodiment of the present disclosure, the searching component 202 may include: an NE searching element, configured to search, when it is monitored that the base station device generates a fault or performance index event of a single NE, the NE for the self-recovery alarm configuration file according to the monitored fault or performance index event of the single NE; and a network manager searching element, configured to search, when it is monitored that the base station device generates a fault or performance index event of an associated NE, a network manager for the self-recovery alarm configuration file according to the monitored fault or performance index event of the associated NE.

Figure 3:
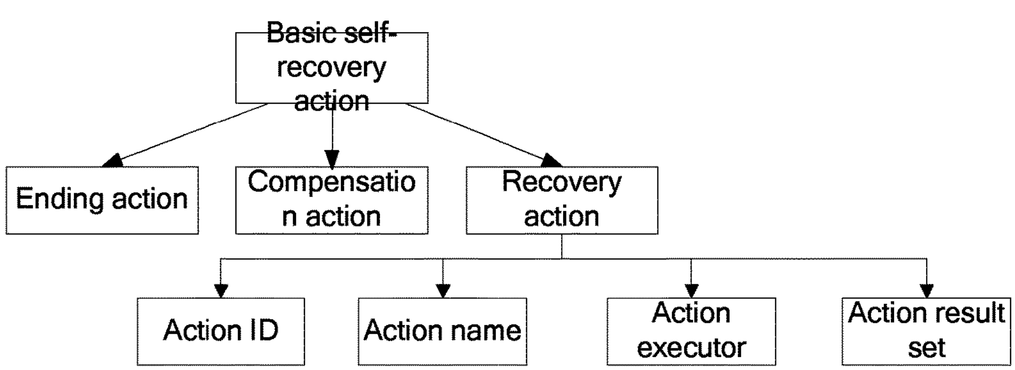
FIG. 3 is a constitutional diagram of a basic self-recovery action on a base station device according to an embodiment of the present disclosure.

FIG. 3 shows a constitutional diagram of a basic self-recovery action on a base station device according to an embodiment of the present disclosure. As shown in FIG. 3, the basic self-recovery action on the base station device may include a recovery action, a compensation action and an ending action. Each recovery action may include an action ID, an action name, an action executor and an action result set. Action names for an NE may be, for example, query of parameters of this NE and reset of a single board. Action names for a network manager may be, for example, query of parameters of an associated NE and query of an alarm of an associated NE. Table 1 is a basic action attribute table.

TABLE 1

| basic action attribute table: | | | | |
|---|---|---|---|---|
| | Action ID | Action name | Executor | Action result set |
| Self-recovery action 1 | 1 | Query of associated alarm | Network manager | Success/failure |
| Self-recovery action 2 | 2 | Reset of ** single board | NE | Success/failure |

In the embodiment of the present disclosure, a self-recovery alarm configuration file is provided for an EMS and an NMS respectively. A self-recovery alarm configuration file of an NE is saved in the NE, and self-recovery execution information which can be completed by this single NE is provided. A self-recovery alarm configuration file involving a network manager is saved by the network manager, and self-recovery execution information which needs to be completed among associated NEs is provided. The network manager and the NE monitor all trigger events saved by themselves respectively.

Figure 4:
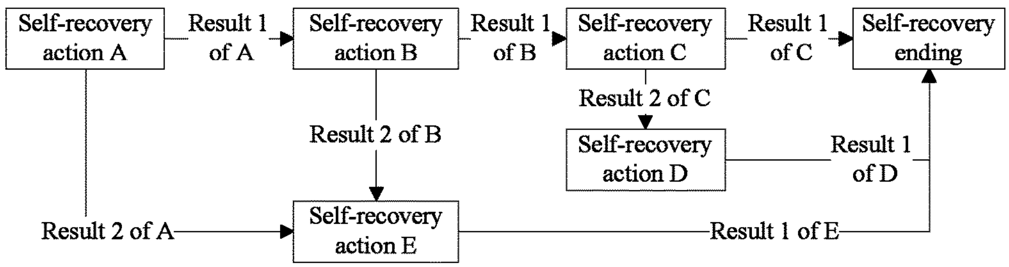
FIG. 4 is a diagram of an alarm self-recovery rule for self-recovery of a base station device according to an embodiment of the present disclosure.

FIG. 4 shows a diagram of an alarm self-recovery rule for self-recovery of a base station device according to an embodiment of the present disclosure. As shown in FIG. 4, a system is provided with a self-recovery rule by default for each event (alarm or performance deterioration) needing self-recovery. The self-recovery rule is an execution mode of providing a self-recovery action for each alarm or performance event to which attention needs to be paid, a set of self-recovery actions are combined into different self-recovery rules, various different alarms can be automatically recovered, and each self-recovery rule is composed of a series of basic self-recovery actions and an execution sequence. When an alarm is generated or the performance deteriorates to a certain extent, the NE or the network manager monitors a self-recovery trigger event, and executes the self-recovery action according to the self-recovery rule until the alarm is solved or the self-recovery action is executed completely. If the recovery action is not able to recover the alarm, the compensation action may be carried in the rule to minimize the influence.

According to the embodiment of the present disclosure, in a scenario that the self-recovery is to be implemented on a single NE without the cooperation of a network manager, most of the recovery actions can be executed by the NE according to the rule without participation of the network manager. This type of rule is issued to the NE, and when the NE monitors an event needing self-recovery, the NE sequentially executes the basic actions according to the set self-recovery rule to implement self-recovery. The basic action of a self-recovery process commonly refers to: reset of a single board.

According to the embodiment of the present disclosure, in a scenario that the self-recovery is to be implemented on a single NE with the cooperation of a network manager, this type of rule is saved in the network manager, and when the network manager monitors an event needing self-recovery, the network manager sequentially executes the basic actions according to the set self-recovery rule, and the basic actions provided by the NE may be invoked in the process. The basic actions of a self-recovery process commonly refer to: modification of parameters of the single NE and reset of a single board.

According to the embodiment of the present disclosure, in a scenario that the self-recovery is to be implemented among NEs with the cooperation of a network manager, most of the recovery actions can be executed by the NEs according to the rule without participation of the network manager. This type of rule is issued to the NEs, and when the NEs monitor an event needing self-recovery, the NEs sequentially execute the basic actions according to the set self-recovery rule to implement self-recovery. The basic action of a self-recovery process commonly refers to: reset of a single board. Some of the basic actions are inter-NE actions such as a compensation action. When an alarm cannot be recovered, in order not to influence other NEs, it is needed to modify parameters of the other NEs to prevent the other NEs from being switched to a fault cell. This basic action may be implemented only in the network manager.

Figure 5:
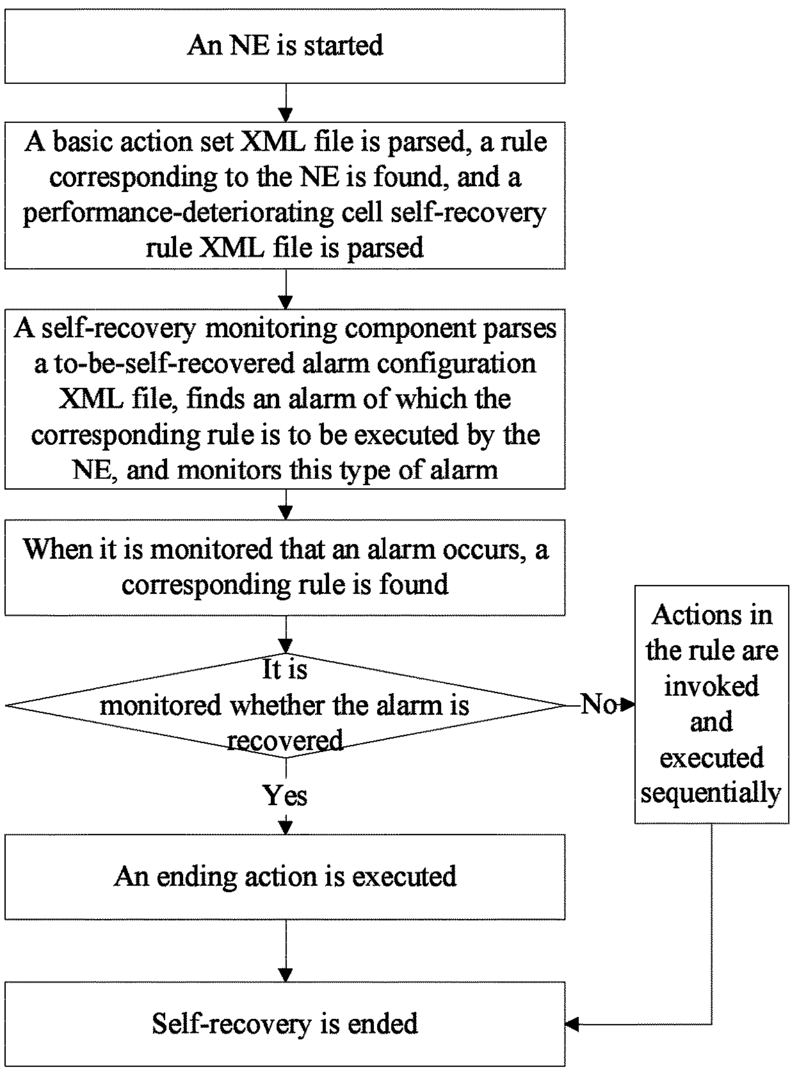
FIG. 5 is a flowchart of a self-recovery process of a base station device at an NE according to an embodiment of the present disclosure.
Figure 6:
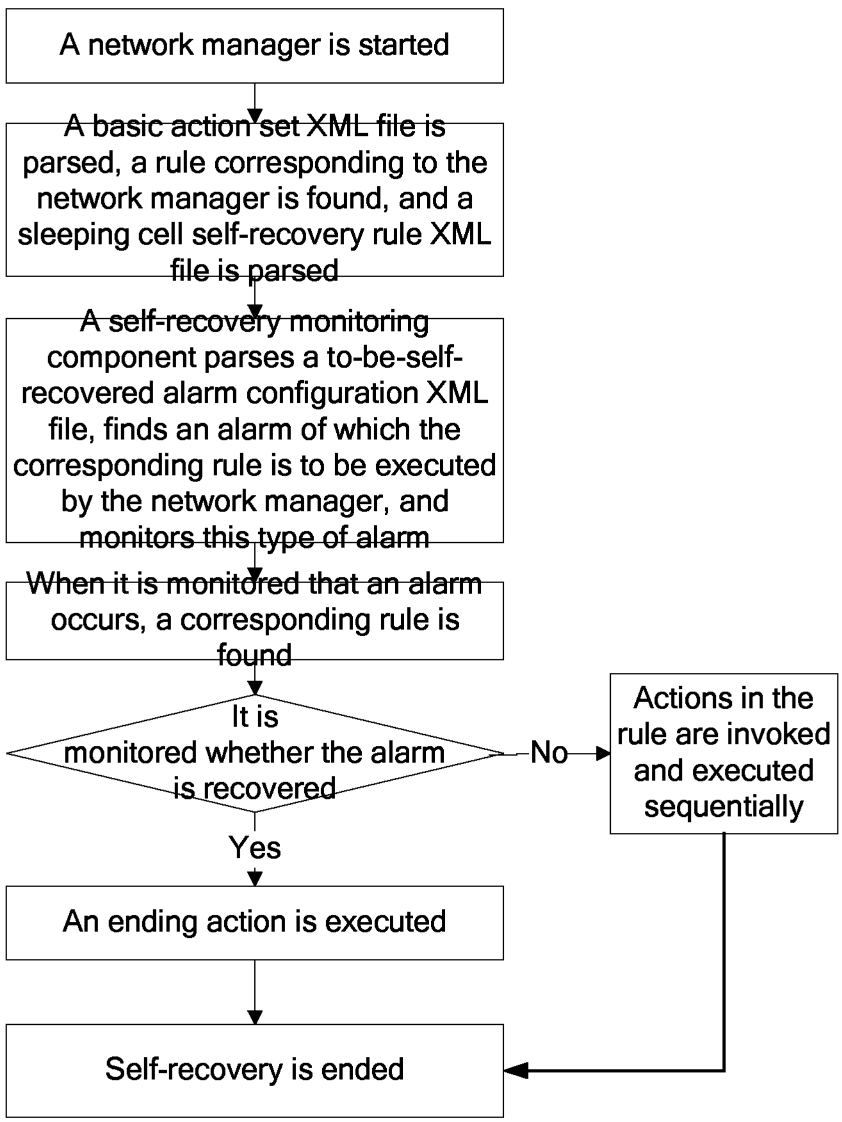
FIG. 6 is a flowchart of a self-recovery process of a base station device at a network manager according to an embodiment of the present disclosure.

The self-recovery processes of two embodiments for an NE and network manager of a base station device according to the embodiments of the present disclosure are described below with reference to FIG. 5 and FIG. 6 by taking a cell sleep alarm and a performance deterioration alarm as examples.

Firstly, the network manager and the NE provide a set of general basic actions which are implemented with reference to a basic action set Extensible Markup Language (XML) file below, an action the actionExecutor of which is NE is to be executed by the NE, and an action the actionExecutor of which is network manager is to be executed by the network manager.

The basic action set XML file:

```
<root>
<action actionID="1"actionName="cell re-establishment"actionExecutor="NE">
        <result resultType="0" resultName="re-establishment sucess"/>
        <result resultType="1" resultName="re-establishment failure"/>
</action>
    <action actionID="2"actionName="whether an affiliated RRU of a cell manages other
normal cells"actionExecutor="network manager">
```

-continued

```
            <result    resultType="0" resultName="all cells managed by an RRU are
abnormal"/>
            <result resultType="1" resultName="there are normal cells in all cells managed
by an RRU"/>
      </action>
      <action actionID="3"actionName="RRU reset"actionExecutor="NE">
            <result resultType="0" resultName="RRU reset success"/>
            <result resultType="1" resultName="RRU reset failure"/>
      </action>
      <action actionID="4"actionName="whether an affiliated BPL of a cell manages other
normal cells"actionExecutor="network manager">
            <result resultType="0" resultName="all cells managed by a BPL are abnormal"/>
            <result resultType="1" resultName="there are normal cells in all cells managed
by a BPL"/>
      </action>
      <action actionID="5"actionName="BPL reset"actionExecutor="NE">
            <result resultType="0" resultName="BPL reset success"/>
            <result resultType="1" resultName="BPL reset failure"/>
      </action>
      <action actionID="6"actionName="attributes of all neighbour cells of a designated cell
are modified into NON-SWITCHABLE"actionExecutor="network manager">
            <result resultType="0" resultName="modification success"/>
            <result resultType="1" resultName="modification failure"/>
      </action>
      <action actionID="7"actionName="self-recovery ending"actionExecutor="NE">
      </action>
      <action      actionID="8"actionName="self-recovery    ending"actionExecutor="network
manager">
      </action>
      </root>
```

Then, a self-recovery rule is defined for each of a cell sleep alarm and a cell performance deterioration alarm. The self-recovery rule of the cell sleep alarm refers to a sleeping cell self-recovery rule XML file below, and the self-recovery rule of the cell performance deterioration alarm refers to a performance-deteriorating cell self-recovery rule XML file below. The self-recovery rule designates whether a rule executor is an NE or a network manager, designates an initial execution action of an alarm and designates which action is executed subsequently according to a previous execution action result.

The sleeping cell self-recovery rule XML file:

```
   <root startActionID="1"ruleType="network manager">
  <action actionID="1">
        <result resultType="0" nextActionID="2"/>
        <result resultType="1" nextActionID="2"/>
  </action>
  <action actionID="2">
        <result resultType="0" nextActionID="3"/>
        <result resultType="1" nextActionID="4"/>
  </action>
  <action actionID="3">
        <result resultType="0" nextActionID="4"/>
        <result resultType="1" nextActionID="4"/>
  </action>
  <action actionID="4">
        <result resultType="0" nextActionID="5"/>
        <result resultType="1" nextActionID="6"/>
  </action>
  <action actionID="5">
        <result resultType="0" nextActionID="6"/>
        <result resultType="1" nextActionID="6"/>
  </action>
  <action actionID="6">
        <result resultType="0" nextActionID="8"/>
        <result resultType="1" nextActionID="8"/>
  </action>
   </root>
  The performance-deteriorating cell self-recovery rule XML file:
   <root startActionID="2"ruleType="NE">
  <action actionID="2">
```

-continued

```
        <result resultType="0" nextActionID="3"/>
        <result resultType="1" nextActionID="4"/>
  </action>
  <action actionID="3">
        <result resultType="0" nextActionID="4"/>
        <result resultType="1" nextActionID="4"/>
  </action>
  <action actionID="4">
        <result resultType="0" nextActionID="5"/>
        <result resultType="1" nextActionID="7"/>
  </action>
  <action actionID="5">
        <result resultType="0" nextActionID="7"/>
        <result resultType="1" nextActionID="7"/>
  </action>
  </root>
```

Finally, a corresponding rule is matched with an alarm to be self-recovered with reference to a to-be-self-recovered alarm configuration XML file. When the NE and the network manager are started, a self-recovery monitoring component parses the to-be-self-recovered alarm configuration XML file, when the self-recovery monitoring component monitors that an alarm exists in the file and the self-recovery monitoring component itself is taken as a rule execution component, a rule corresponding to the alarm is found, and the actions are sequentially executed from a starting action, and when the alarm is recovered in an execution process, the monitoring component invokes an ending action to end the self-recovery process. Otherwise, after the self-recovery action is executed completely, the self-recovery process is automatically ended.

The to-be-self-recovered alarm configuration XML file:

```
   <root startActionID="1">
  <alarm alarmCodeValue="198094456", alarmName="cell sleep
alarm"
  processorRule="sleeping cell self-recovery rule"/>
```

-continued

```
<alarm alarmCodeValue="198094457", alarmName="cell
performance deterioration alarm"
processorRule="performance-deteriorating cell self-recovery rule"/>
</root>
```

The self-recovery action includes recovery actions (action 1, action 2, action 3, action 4 and action 5), a compensation action (action 6) and ending actions (action 7 and action 8). When the alarm cannot be recovered after all recovery actions are completely executed, the compensation action is continuously executed to minimize the influence on the entire system caused by the alarm, and the ending action is executed finally.

A user on the network manager is able to check and modify a self-recovery rule of each alarm, and is allowed to replace an unreasonable self-recovery rule or a subsequent action of a self-recovery action result.

The user on the network manager can manually set a self-recovery rule for an alarm which does not carry a self-recovery rule according to basic self-recovery actions provided by the system, and add the alarm to the to-be-self-recovered alarm configuration XML file; and these alarms can be self-recovered subsequently according to the self-recovery rules set by the user.

When an NMS is upgraded, a self-recovery rule on a site is automatically imported, and a default self-recovery rule of the system is updated so as to be more reasonable.

To sum up, in the embodiments of the present disclosure, when the alarm is generated or the performance deteriorates, the system can automatically implement alarm self-recovery or performance optimization according to the configured self-recovery rule. If it is discovered that the self-recovery rule is unreasonable or does not meet the requirements of the user in a practical scenario, the user can dynamically adjust the self-recovery rule. The self-recovery rule set by the user can be collected periodically, the default self-recovery rule in the system can be updated. If there is an alarm or performance event for which the system does not provide the default self-recovery rule, as long as this an alarm or performance event can be recovered by means of a self-recovery action set provided by the system, the user can set the self-recovery rule according to the self-recovery actions provided by the system, so that it is subsequently unnecessary to manually solve the alarm, and the system automatically handles the alarm according to the self-recovery rule.

To sum up, the embodiments of the present have the technical effects as follows.

When a single NE alarm or an associated NE alarm or performance deterioration (when there is performance deterioration on a single NE or the performance deterioration on a single NE affects multiple NEs) occurs, the user can solve the alarm without needing manual effort, or optimize the performance without needing to manually and repeatedly optimize corresponding parameters, and the system can automatically implement alarm self-recovery or performance optimization according to the pre-provided self-recovery rule. Moreover, the user can adjust the self-recovery rule according to practical conditions. After the user adjusts the self-recovery rule, the system can recover this type of alarm, configured by the user, according to this rule without needing to worry about that the self-recovery rule provided by the system is unreasonable or does not meet the requirements. Meanwhile, a self-recovery rule base can periodically collect and automatically update the rules of the user so as to make self-recovery more effective. By means of the method, manual intervention can be reduced, and the operation cost and the maintenance cost are reduced.

Although the present disclosure is described above in detail, the present disclosure is not limited thereto, and those skilled in the art can make various modifications according to the principle of the present disclosure. Thus, the modifications made according to the principle of the present disclosure should be interpreted as falling within the protection scope of the present disclosure.

INDUSTRIAL APPLICABILITY

The embodiments of the present disclosure can be applied to the technical field of communications. By pre-setting a fault self-recovery rule, under the condition that a base station has a fault or undergoes performance deterioration, a system automatically handles a fault according to the self-recovery rule, thereby reducing the complexity of manually handling a fault, reducing the dependence of fault handling on a professional engineer, and maintaining a base station device more safely and effectively.

What is claimed is:

1. A method for implementing self recovery of a base station device, comprising:

monitoring, in real time, whether the base station device generates a fault or performance index event;

searching, when it is monitored that the base station device generates the fault or performance index event, for a self-recovery alarm configuration file according to the monitored fault or performance index event;

acquiring corresponding self-recovery execution information according to the found self-recovery alarm configuration file; and implementing self-recovery according to the self-recovery execution information;

wherein the self-recovery alarm configuration file comprises a single Network Equipment (NE) self-recovery alarm configuration file and an associated NE self-recovery alarm configuration file; the single NE self-recovery alarm configuration file is saved in an NE, and the associated NE self-recovery alarm configuration file is saved in a network manager;

wherein searching, when it is monitored that the base station device generates the fault or performance index event, for the self-recovery alarm configuration file according to the monitored fault or performance index event comprises: searching, when it is monitored that the base station device generates a fault or performance index event of a single NE, the NE for the self-recovery alarm configuration file according to the monitored fault or performance index event of the single NE; and searching, when it is monitored that the base station device generates a fault or performance index event of an associated NE, a network manager for the self-recovery alarm configuration file according to the monitored fault or performance index event of the associated NE.

2. The method as claimed in claim 1, wherein the self-recovery execution information comprises a self-recovery action, a self-recovery execution mode and a self-recovery execution device for executing the self-recovery action.

3. The method as claimed in claim 2, wherein the self-recovery action comprises a recovery action, a compensation action and an ending action.

4. The method as claimed in claim 3, wherein when the single NE or associated NE is not able to recover an alarm about the fault or performance index event by using the recovery action, the compensation action is executed, the compensation action referring to that an NE having no alarm is not allowed to be switched to a fault cell of an NE having the alarm by modifying a parameter of the NE having no alarm.

5. The method as claimed in claim 1, wherein searching, when it is monitored that the base station device generates the fault or performance index event, for the self-recovery alarm configuration file according to the monitored fault or performance index event comprises:

searching, when it is monitored that the base station device generates a fault or performance index event of a single NE, the NE for the self-recovery alarm configuration file according to the monitored fault or performance index event of the single NE; and searching, when it is monitored that the base station device generates a fault or performance index event of an associated NE, a network manager for the self-recovery alarm configuration file according to the monitored fault or performance index event of the associated NE.

6. The method as claimed in claim 5, wherein the self-recovery execution information comprises a self-recovery action, a self-recovery execution mode and a self-recovery execution device for executing the self-recovery action.

7. The method as claimed in claim 6, wherein the self-recovery action comprises a recovery action, a compensation action and an ending action.

8. The method as claimed in claim 7, wherein when the single NE or associated NE is not able to recover an alarm about the fault or performance index event by using the recovery action, the compensation action is executed, the compensation action referring to that an NE having no alarm is not allowed to be switched to a fault cell of an NE having the alarm by modifying a parameter of the NE having no alarm.

9. An apparatus for implementing self recovery of a base station device, comprising:

a monitoring component, configured to monitor, in real time, whether the base station device generates a fault or performance index event;

a searching component, configured to search, when it is monitored that the base station device generates the fault or performance index event, for a self-recovery alarm configuration file according to the monitored fault or performance index event;

an acquisition component, configured to acquire corresponding self-recovery execution information according to the found self-recovery alarm configuration file; and a self-recovery component, configured to implement self-recovery according to the self-recovery execution information;

wherein the self-recovery alarm configuration file comprises a single Network Equipment (NE) self-recovery alarm configuration file and an associated NE self-recovery alarm configuration file; the single NE self-recovery alarm configuration file being saved in an NE, and the associated NE self-recovery alarm configuration file being saved in a network manager;

wherein the searching component comprises: an NE searching element, configured to search, when it is monitored that the base station device generates a fault or performance index event of a single NE, the NE for the self-recovery alarm configuration file according to the monitored fault or performance index event of the single NE; and a network manager searching element, configured to search, when it is monitored that the base station device generates a fault or performance index event of an associated NE, a network manager for the self-recovery alarm configuration file according to the monitored fault or performance index event of the associated NE.

* * * * *